(12) United States Patent
You et al.

(10) Patent No.: US 10,132,964 B2
(45) Date of Patent: Nov. 20, 2018

(54) LOW-EMISSIVITY COATING FILM, METHOD FOR MANUFACTURING SAME, AND FUNCTIONAL CONSTRUCTION MATERIAL FOR WINDOW AND DOORS INCLUDING SAME

(71) Applicant: LG Hausys, Ltd., Seoul (KR)

(72) Inventors: Hyun-Woo You, Incheon (KR); Youn-Ki Jun, Gwacheon-si (KR); Dae-Hoon Kwon, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 15/100,316

(22) PCT Filed: Dec. 11, 2014

(86) PCT No.: PCT/KR2014/012221
§ 371 (c)(1),
(2) Date: Jun. 2, 2016

(87) PCT Pub. No.: WO2015/088269
PCT Pub. Date: Jun. 18, 2015

(65) Prior Publication Data
US 2016/0299259 A1    Oct. 13, 2016

(30) Foreign Application Priority Data
Dec. 12, 2013  (KR) .................. 10-2013-0154920

(51) Int. Cl.
*G02B 1/116* (2015.01)
*C09D 7/40* (2018.01)
(Continued)

(52) U.S. Cl.
CPC .............. *G02B 1/116* (2013.01); *C09D 1/00* (2013.01); *C09D 5/00* (2013.01); *C09D 5/24* (2013.01);
(Continued)

(58) Field of Classification Search
USPC ....... 428/426, 428, 432, 433, 434, 688, 689, 428/697, 698, 699, 701, 702
See application file for complete search history.

(56) References Cited

U.S. PATENT DOCUMENTS 6,586,102 B1 * 7/2003 Stachowiak ............ C03C 17/36
428/426
6,589,658 B1 * 7/2003 Stachowiak ............ C03C 17/36
428/426
(Continued)

FOREIGN PATENT DOCUMENTS

KR     20110033769 A     3/2011
KR     20110062566 A     6/2011
(Continued)

OTHER PUBLICATIONS

International Search Report dated Mar. 12, 2015 corresponding to International Application No. PCT/KR2014/012221, citing the above reference(s).

*Primary Examiner* — Lauren R Colgan
(74) *Attorney, Agent, or Firm* — Hauptman Ham, LLP (57) ABSTRACT

The present invention relates to a low-emissivity coating film, a method for manufacturing the same, and a functional construction material for windows and doors including the same, wherein the low-emissivity coating film includes: a base; a low-emissivity coating layer; and an uppermost coating layer, the uppermost coating layer having a multi-layer structure sequentially including, from the low-emissivity coating layer, a metal layer, a metal oxide layer and a metal oxynitride layer.

9 Claims, 7 Drawing Sheets

(51) Int. Cl.
- *C09D 5/00* (2006.01)
- *G02B 1/00* (2006.01)
- *C09D 1/00* (2006.01)
- *C09D 5/24* (2006.01)
- *C09D 7/20* (2018.01)
- *C09D 7/63* (2018.01)

(52) U.S. Cl.
CPC .................. *C09D 7/20* (2018.01); *C09D 7/40* (2018.01); *C09D 7/63* (2018.01); *G02B 1/00* (2013.01)

(56) References Cited

U.S. PATENT DOCUMENTS

| | | | | |
|---|---|---|---|---|
| 6,802,943 B2 * | 10/2004 | Stachowiak | ............ | C03C 17/36 204/192.12 |
| 7,153,578 B2 * | 12/2006 | Chonlamaitri | .......... | C03C 17/36 428/428 |
| 7,390,572 B2 * | 6/2008 | Butz | ........................ | C03C 17/36 428/428 |
| 8,263,227 B2 * | 9/2012 | Disteldorf | ............... | C03C 17/36 428/428 |
| 8,506,001 B2 * | 8/2013 | Benito Gutierrez | .... | C03C 17/36 296/201 |
| 8,815,420 B2 * | 8/2014 | Krasnov | ................. | C03C 17/36 428/432 |
| 2004/0197574 A1 * | 10/2004 | Stachowiak | ........ | C03C 17/3435 428/432 |
| 2006/0121290 A1 * | 6/2006 | Chonlamaitri | .......... | C03C 17/36 428/428 |
| 2006/0134436 A1 * | 6/2006 | Maschwitz | ............. | C03C 17/36 428/426 |
| 2007/0281171 A1 * | 12/2007 | Coster | ............... | B32B 17/10036 428/432 |
| 2009/0324967 A1 * | 12/2009 | Disteldorf | ............... | C03C 17/36 428/428 |
| 2011/0261442 A1 * | 10/2011 | Knoll | ...................... | C03C 17/36 359/360 |
| 2011/0262726 A1 * | 10/2011 | Knoll | ...................... | C03C 17/36 428/213 |
| 2012/0171443 A1 * | 7/2012 | Jun | ..................... | C03C 17/3618 428/216 |
| 2013/0216860 A1 * | 8/2013 | Imran | ................ | C03C 17/3618 428/623 |

FOREIGN PATENT DOCUMENTS

| | | |
|---|---|---|
| KR | 20130051521 A | 5/2013 |
| WO | 2012165501 A1 | 12/2012 |

* cited by examiner

LOW-EMISSIVITY COATING FILM, METHOD FOR MANUFACTURING SAME, AND FUNCTIONAL CONSTRUCTION MATERIAL FOR WINDOW AND DOORS INCLUDING SAME

CROSS REFERENCE TO RELATED APPLICATION

This application claims the priority of Korean Patent Application No. 10-2013-0154920, filed on Dec. 12, 2013 in the KIPO (Korean Intellectual Property Office). Further, this application is the National Phase application of International Application No. PCT/KR2014/012221 filed Dec. 11, 2014, which designates the United States and was published in Korean.

TECHNICAL FIELD

The present invention relates to a low-emissivity coating film, and a method for manufacturing the same, and a functional construction material for window and doors including the same.

BACKGROUND ART

A low-emissivity glass refers to a glass in which a low-emissivity layer containing a metal having high reflectivity in an infrared region such as silver (Ag) is deposited as a thin film. The low-emissivity glass is a functional material having an energy saving effect of buildings by reflecting radiant rays in the infrared region to block outdoor solar radiant heat in summer and to preserve interior heat radiant heat.

Silver (Ag) generally used as the low-emissivity layer is oxidized when being exposed during air, such that dielectric layers are deposited as anti-oxidation films on an upper part and a lower part of the low-emissivity layer. The dielectric layers serve to increase visible light transmittance.

DISCLOSURE

Technical Problem

It is an aspect of the present invention to provide a low-emissivity coating film including a base, a low-emissivity coating layer and an uppermost coating layer, wherein the uppermost coating layer has a multilayer structure sequentially including, from the low-emissivity coating layer, a metal layer, a metal oxide layer and a metal oxynitride layer.

However, technical problems to be achieved in the present invention are not limited to the above-mentioned problems, and other non-mentioned technical problems will be clearly understood to those skilled in the art from the following descriptions.

Technical Solution

In accordance with one aspect of the present invention, there is provided a low-emissivity coating film including: a base; a low-emissivity coating layer; and an uppermost coating layer, wherein the uppermost coating layer has a multilayer structure sequentially including, from the low-emissivity coating layer, a metal layer, a metal oxide layer and a metal oxynitride layer.

The metal layer may include at least one selected from silicon, aluminum, titanium, zirconium, silicon-based composite metal, titanium-based composite metal, zirconium-based composite metal, and combinations thereof.

The metal oxide layer may include at least one selected from silicon oxide, aluminum oxide, titanium oxide, zirconium oxide, silicon-based composite metal oxide, titanium-based composite metal oxide, zirconium-based composite metal oxide, and combinations thereof.

The metal oxynitride layer may include zirconium-based composite metal oxynitride.

The low-emissivity coating layer may have a multilayer structure sequentially including, from the substrate, a first dielectric layer, a first low-emissivity protection layer, a low-emissivity layer, a second low-emissivity protection layer, and a second dielectric layer.

The first dielectric layer or the second dielectric layer may include at least one selected from the group consisting of titanium oxide, tin zinc oxide, zinc oxide, zinc aluminum oxide, tin oxide, bismuth oxide, silicon nitride, silicon aluminum nitride, silicon tin nitride, and combinations thereof, or may include the at least one doped with at least one element selected from the group consisting of bismuth (Bi), boron (B), aluminum (Al), silicon (Si), magnesium (Mg), antimony (Sb), beryllium (Be), and combinations thereof.

The first low-emissivity protection layer or the second low-emissivity protection layer may include at least one selected from the group consisting of nickel (Ni), chromium (Cr), nickel (Ni)-chromium (Cr) alloy, titanium (Ti) and combinations thereof.

The low-emissivity layer may include at least one selected from the group consisting of silver (Ag), gold (Au), copper (Cu), aluminum (Al), platinum (Pt), ion-doped metal oxides, and combinations thereof.

The metal layer may have a thickness of 0.5 nm to 5 nm.

The metal oxide layer may have a thickness of 0.5 nm to 5 nm.

The metal oxynitride layer may have a thickness of 2 nm to 20 nm.

In accordance with another aspect of the present invention, there is provided a method for manufacturing a low-emissivity coating film including: (a) preparing a low-emissivity coating layer stacked on at least one surface of a base; (b) forming a metal layer by depositing a metal on the low-emissivity coating layer; and (c) forming a metal oxide layer on the metal layer, and forming a metal oxynitride layer by depositing metal oxynitride.

The metal layer in (b) may include at least one selected from silicon, aluminum, titanium, zirconium, silicon-based composite metal, titanium-based composite metal, zirconium-based composite metal, and combinations thereof.

The metal oxide layer in (c) may include at least one selected from silicon oxide, aluminum oxide, titanium oxide, zirconium oxide, silicon-based composite metal oxide, titanium-based composite metal oxide, zirconium-based composite metal oxide, and combinations thereof.

The metal oxynitride layer in (c) may include zirconium-based composite metal oxynitride.

The forming of the metal oxide layer in (c) may be performed by partially oxidizing a surface of the metal layer through a post oxidation process of the surface of the metal layer.

The post oxidation process may be performed by using at least one reactive gas selected from the group consisting of oxygen ($O_2$), nitrogen ($N_2$) and argon (Ar).

The partially oxidizing of the surface of the metal layer and the depositing of the metal oxynitride in (c) may be continuously performed in-situ.

In accordance with another aspect of the present invention, there is provided a functional construction material for window and doors including the low-emissivity coating film as described above.

Advantageous Effects

The low-emissivity coating film according to the present invention may have excellent abrasion resistance which is a mechanical property, and may have excellent moisture resistance, corrosion resistance, acid resistance and basic resistance which are chemical properties, and may also have thermal properties. In the method for manufacturing the low-emissivity coating film according to the present invention, oxidation of a surface of a metal layer and deposition of metal oxide nitride may be continuously performed in-situ, thereby increasing durability and process efficiency.

BEST MODE

The present inventors researched and manufactured a low-emissivity coating film including an uppermost coating layer having a multilayer structure, wherein the uppermost coating layer sequentially includes a metal layer, a metal oxide layer and a metal oxynitride layer, and confirmed that the manufactured low-emissivity coating film had excellent mechanical properties, chemical properties, and thermal properties, and completed the present invention.

Hereinafter, exemplary embodiments of the present invention will be described in detail with reference to the accompanying drawings so that those skilled in the art may easily practice the present invention. The present invention may be implemented in various different ways and is not limited to the exemplary embodiments provided in the present description.

The description of parts deviating from the subject matter of the present invention will be omitted in order to clearly describe the present invention. Like reference numerals designate like elements throughout the specification.

In the drawings, thicknesses of various layers and regions are exaggerated for clarity. In the drawings, thicknesses of partial layers and regions are exaggerated for convenience of explanation.

Hereinafter, formation of any configuration "on (or below)" of a substrate means that any configuration is formed while contacting an upper surface (or a lower surface) of the substrate, and should not be intended to exclude other configurations between the substrate and any configuration formed on (or below) the substrate.

The present invention provides a low-emissivity coating film including a base; a low-emissivity coating layer; and an uppermost coating layer, wherein the uppermost coating layer has a multilayer structure sequentially including, from the low-emissivity coating layer, a metal layer, a metal oxide layer and a metal oxynitride layer.

Figure 1:
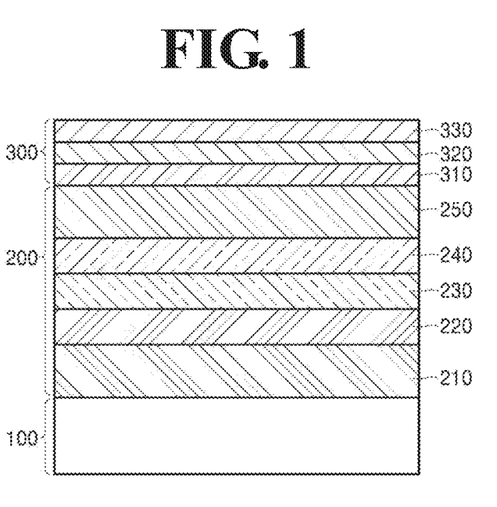
FIG. 1 is a cross-sectional view schematically showing a low-emissivity coating film according to an exemplary embodiment of the present invention.

FIG. 1 is a cross-sectional view schematically showing the low-emissivity coating film according to an exemplary embodiment of the present invention.

As shown in FIG. 1, the low-emissivity coating film according to an exemplary embodiment of the present invention includes a base 100; a low-emissivity coating layer 200 having a multilayer structure sequentially including, from the substrate, a first dielectric layer 210, a first low-emissivity protection layer 220, a low-emissivity layer 230, a second low-emissivity protection layer 240, and a second dielectric layer 250; and an uppermost coating layer 300 having a multilayer structure sequentially including, from the low-emissivity coating layer, a metal layer 310, a metal oxide layer 320 and a metal oxynitride layer 330.

Substrate (100)

The substrate 100 may be a transparent substrate having high visible light transmittance. For example, the substrate may be a glass or a transparent plastic substrate having about 80% to about 100% of visible light transmittance. For example, as the substrate, a glass used for construction may be used without limitation. In addition, a thickness of the substrate may be about 2 mm to about 12 mm, and may vary depending on use purpose and function, but the thickness of the substrate is not limited thereto.

Low-Emissivity Coating Layer (200)

The low-emissivity coating layer (200) may have a multilayer structure sequentially including, from the substrate, the first dielectric layer 210, the first low-emissivity protection layer 220, the low-emissivity layer 230, the second low-emissivity protection layer 240, and the second dielectric layer 250.

The first dielectric layer 210 and the second dielectric layer 250 may function as an anti-oxidation film of the low-emissivity layer 230 since it is general that the metal used as the low-emissivity layer 230 is easily oxidized. In addition, the first dielectric layer 210 and the second dielectric layer 250 serve to increase visible light transmittance.

The first dielectric layer 210 and the second dielectric layer 250 may contain various metal oxides, metal nitrides, etc., but the present invention is not limited thereto. Materials used for protecting the low-emissivity layer 230 known in the art may be used without limitation. The first dielectric layer 210 and the second dielectric layer 250 may include, for example, at least one selected from the group consisting of titanium oxide, tin zinc oxide, zinc oxide, zinc aluminum oxide, tin oxide, bismuth oxide, silicon nitride, silicon aluminum nitride, silicon tin nitride, and combinations thereof, but the present invention is not limited thereto. The metal oxide and the metal nitride may be doped with at least one element selected from the group consisting of bismuth (Bi), boron (B), aluminum (Al), silicon (Si), magnesium (Mg), antimony (Sb), beryllium (Be), and combinations thereof, and as a result, durability may be improved.

Optical performance of the low-emissivity coating film may be controlled by appropriately controlling materials and physical properties of the first dielectric layer 210 and the second dielectric layer 250. The first dielectric layer 210 and the second dielectric layer 250 may be made of a dielectric material having a refractive index of about 1.5 to about 2.3, and a thickness of the first dielectric layer 210 and the second dielectric layer 250 may be controlled to implement a desired target level of transmittance, reflectivity, transmission, reflection color, etc., depending on the refractive index values.

For example, the thickness of the first dielectric layer 210 and the second dielectric layer 250 may be about 5 nm to about 20 nm. In order to control total optical performance (transmittance, reflectivity, color index) of the multilayer thin film to meet target performance, the thickness of the first dielectric layer 210 and the second dielectric layer 250 may be variously controlled depending on positions and materials to be configured. By including the first dielectric layer 210 and the second dielectric layer 250 having the above-described range of thickness, the optical performance may be effectively controlled by the first dielectric layer 210 and the second dielectric layer 250, and an appropriate production speed may be implemented.

The first dielectric layer 210 and the second dielectric layer 250 may be made of a material having a light extinction coefficient similar to 0. When the light extinction coefficient is larger than 0, it means that an incident light is absorbed in the dielectric layer before it reaches the metal layer absorbing light, which is not preferred since securement of clear vision may be inhibited. Accordingly, the extinction coefficient of the first dielectric layer 210 and the second dielectric layer 250 may be less than about 0.1 in a visible light region (at a wavelength range of about 380 nm to about 780 nm). As a result, the first dielectric layer 210 and the second dielectric layer 250 may secure an excellent lighting property, thereby securing clear vision.

The low-emissivity layer 230 is a layer made of an electrically conductive material having a low emissivity, for example, a metal, and has a low sheet resistance, and accordingly, a low emissivity. For example, the low-emissivity layer 230 may have an emissivity of about 0.01 to about 0.3, specifically, about 0.01 to about 0.2, more specifically, about 0.01 to about 0.1, and still more specifically, about 0.01 to about 0.08.

The low-emissivity layer 230 having the above-described range of emissivity may simultaneously implement an excellent lighting property and an insulation effect by appropriately controlling visible light transmittance and infrared emissivity. In the low-emissivity layer 230 having the above-described range of emissivity, a sheet resistance of a material forming the thin film may be, for example, about 0.78 Ω/sq to about 6.42 Ω/sq, but the sheet resistance thereof is not limited thereto.

The low-emissivity layer 230 functions to selectively transmit and reflect solar radiant ray, and specifically, has a low emissivity since reflectivity for radiant ray in an infrared region is high. The low-emissivity layer 230 may include at least one selected from the group consisting of silver (Ag), gold (Au), copper (Cu), aluminum (Al), platinum (Pt), ion-doped metal oxides, and combinations thereof, but the present invention is not limited thereto. For the low-emissivity layer 230, metals capable of implementing low-emissivity performance known in the art may be used without limitation. The ion-doped metal oxide may include indium tin oxide (ITO), fluorine-doped tin oxide (FTO), aluminum (Al)-doped zinc oxide (AZO), gallium zinc oxide (GZO), etc. In an exemplary embodiment of the present invention, the low-emissivity layer 230 may be a layer made of silver (Ag), and as a result, the low-emissivity coating film may implement high electrical conductivity, a low absorption rate in a visible light region, durability, etc.

For example, the low-emissivity layer 230 may have a thickness of about 5 nm to about 25 nm. The low-emissivity layer 230 having the above-described range of thickness is appropriate for simultaneously implementing low infrared emissivity and high visible light transmittance.

The first low-emissivity protection layer 220 and the second low-emissivity protection layer 240 are made of a metal having excellent light absorption performance to control sunlight. Color that is implemented by low-emissivity coating film may be controlled by controlling a material, a thickness, etc., of the first low-emissivity protection layer 220 and the second low-emissivity protection layer 240.

The extinction coefficient in the visible light region of the first low-emissivity protection layer 220 and the second low-emissivity protection layer 240 may be about 1.5 to about 3.5. The extinction coefficient is a value derived from an optical constant which is a unique characteristic of a material, wherein the optical constant is represented by n-iK. Here, n which is a real part indicates a refractive index, and k which is an imaginary part indicates an extinction coefficient (which is also referred to as an absorption coefficient, an light absorption coefficient, a light extinction coefficient, etc.) The extinction coefficient is a function of wavelength ($\lambda$), and it is general that an extinction coefficient of the metal is larger than 0. When the extinction coefficient (k) and the absorption coefficient ($\alpha$) satisfy a relationship of $\alpha=(4\pi k)\lambda$, and the absorption coefficient ($\alpha$) and a thickness of a medium through which light passes (d) satisfy a relationship of $I=I0\exp(-\alpha d)$, intensity (I) of light passing through the medium is smaller than intensity (I0) of incident light due to light absorption by the medium. In the first low-emissivity protection layer 220 and the second low-emissivity protection layer 240, the metal satisfying the above-described range of the extinction coefficient in the visible light region is used to absorb a predetermined portion of visible light, thereby allowing the low-emissivity coating film to have a predetermined color.

The first low-emissivity protection layer 220 or the second low-emissivity protection layer 240 may include, for example, at least one selected from the group consisting of nickel (Ni), chromium (Cr), nickel (Ni)-chromium (Cr) alloy, titanium (Ti) and combinations thereof, but the present invention is not limited thereto.

For example, the thickness of the first low-emissivity protection layer 220 or the second low-emissivity protection layer 240 may be about 0.5 nm to about 5 nm. The low-emissivity coating film may include the first low-emissivity protection layer 220 or the second low-emissivity protection layer 240 having the above-described range of thickness, thereby serving as the low-emissivity protection layer and being controlled to have a predetermined transmittance and reflectivity.

Uppermost Coating Layer (300)

The uppermost coating layer 300 may have a multilayer structure sequentially including, from the low-emissivity coating layer 200, the metal layer 310, the metal oxide layer 320 and the metal oxynitride layer 330.

The metal layer 310 is formed by deposition on the low-emissivity coating layer 200.

When the metal oxide layer 320 is formed by partially oxidizing a surface of the metal layer 310 through a post oxidation process of the surface of the metal layer 310, the metal layer may mean a layer that is not partially oxidized but remains. Due to the formation of the metal layer 310, the low-emissivity coating film has excellent chemical properties.

The metal layer 310 may include at least one metal selected from the group consisting of silicon (Si), aluminum (Al), titanium (Ti), zirconium (Zr), indium (In), tin (Sn), thallium (Tl), lead (Pb), Tin (Sb), bismuth (Bi), hafnium (Hf), vanadium (V), niobium (Nb), tantalum (Ta), and combinations thereof, and preferably, may include at least one metal selected from the group consisting of silicon, aluminum, titanium, zirconium, silicon-based composite metal, titanium-based composite metal, zirconium-based composite metal, and combinations thereof, and more preferably, may include zirconium or zirconium-based composite metal, but the present invention is not limited thereto. The metal layer 310 may inhibit a process in which chemical reaction materials introduced from the outside, for example, $O_2$, $H_2O$, $Na^+$, etc., diffuse into the low-emissivity layer 230, thereby improving chemical properties of the low-emissivity coating film.

That is, since the metal layer 310 is formed by deposition on the low-emissivity coating layer 200, the metal layer 310 inhibits diffusion of the chemical reaction materials such as $O_2$, $H_2O$, S, $Na^+$, etc., such that the low-emissivity coating film may have excellent chemical properties such as moisture resistance, acid resistance, basic resistance, etc.

In addition, the metal layer 310 preferably has a thickness of 0.5 nm to 5 nm, but the present invention is not limited thereto. For example, when the metal oxide layer 320 is formed by partially oxidizing the surface of the metal layer 310 through a post oxidation process of the surface of the metal layer 310, a thickness of the metal layer 310 may mean a final thickness that is not partially oxidized but remains. Here, when the thickness of the metal layer 310 is less than 0.5 nm, chemical properties of the low-emissivity coating film, for example, moisture resistance, acid resistance, basic resistance, etc., are reduced, and when the thickness of the metal layer 310 is more than 5 nm, transmittance of the low-emissivity coating film is slightly reduced.

The metal oxide layer 320 is formed on the metal layer 310. Due to the formation of the metal oxide layer 320, excellent mechanical properties of the low-emissivity coating film may be provided, and diffusion of the chemical reaction materials such as $O_2$, $H_2O$, $Na^+$, etc., may be inhibited to provide excellent chemical properties.

In particular, when the metal oxide layer 320 is formed by partially oxidizing the surface of the metal layer 310 through the post oxidation process of the surface of the metal layer 310, the metal is oxidized by the post oxidation process to form the metal oxide, which generates volume expansion. Due to the volume expansion, a high density metal oxide layer 320 may be formed to further increase hardness of the low-emissivity coating film.

That is, when the metal oxide layer 320 is formed by partially oxidizing the surface of the metal layer 310 through the post oxidation process of the surface of the metal layer 310, hardness of the low-emissivity coating film may be remarkably increased as compared to a case in which only the metal oxide layer is omitted among the uppermost coating layer.

The metal oxide layer 320 may include at least one metal oxide selected from silicon oxide ($SiO_2$), aluminum oxide ($Al_2O_3$), titanium oxide ($TiO_2$), zirconium oxide ($ZrO_2$), indium oxide ($In_2O_3$), tin oxide ($SnO_2$), thallium oxide ($TlO_2$), lead oxide ($PbO_2$), tin oxide ($SbO_2$), bismuth oxide ($Bi_2O_3$), hafnium oxide ($HfO_2$), vanadium oxide ($V_2O_3$), niobium oxide ($Nb_2O_5$), tantalum oxide ($Ta_2O_3$), and combinations thereof, and preferably, may include at least one selected from the group consisting of silicon oxide, aluminum oxide, titanium oxide, zirconium oxide, silicon-based composite metal oxide, titanium-based composite metal oxide, zirconium-based composite metal oxide, and combinations thereof, and more preferably, may include zirconium oxide or zirconium-based composite metal oxide, but the present invention is not limited thereto.

The metal oxide layer 320 preferably has a thickness of 0.5 nm to 5 nm, but the thickness of the metal oxide layer is not limited thereto. For example, when the metal oxide layer 320 is formed by partially oxidizing the surface of the metal layer 310 through the post oxidation process of the surface of the metal layer 310, an initial thickness of the metal layer 310 may be 1 nm to 10 nm. Through the post oxidation process, 0.5 nm to 5 nm of the surface of the metal layer 310 may be oxidized to be a thickness of the metal oxide layer 320.

The metal oxynitride layer 330 is formed by deposition of metal oxynitride, and due to the formation of the metal oxynitride layer 330, the low-emissivity coating film has excellent mechanical properties and chemical properties.

The metal oxynitride layer 330 may include metal oxynitride containing at least one metal selected from the group consisting of silicon (Si), aluminum (Al), titanium (Ti), zirconium (Zr), indium (In), tin (Sn), thallium (Tl), lead (Pb), Tin (Sb), bismuth (Bi), hafnium (Hf), vanadium (V), niobium (Nb), tantalum (Ta), and combinations thereof, and preferably, may include metal oxynitride containing at least one metal selected from the group consisting of silicon, aluminum, titanium, zirconium, silicon-based composite metal, titanium-based composite metal, zirconium-based composite metal, and combinations thereof, and more preferably, may include zirconium-based composite metal oxynitride, but the present invention is not limited thereto. The mechanical properties such as abrasion resistance, etc., may be further improved due to excellent hardness of the composite metal oxynitride layer 330.

The metal oxynitride layer 330 may have a thickness of 2 nm to 20 nm. Here, when the thickness of the metal oxynitride layer 330 is less than 2 nm, mechanical properties such as abrasion resistance, etc., are reduced, and when the thickness of the metal oxynitride layer 330 is more than 20 nm, transmittance is reduced.

The low-emissivity coating film may be formed in a multilayer thin film structure on the basis of the low-emissivity layer 230 selectively reflecting far-infrared ray among solar radiant rays, and accordingly, emissivity is reduced to provide excellent insulation performance by low emissivity, i.e., a low-e effect, on the low-emissivity coating film.

The low-emissivity coating film is a functional material formed in the above-described structure to have an energy saving effect of buildings by reflecting outdoor solar radiant heat in summer and preserving interior heat radiant heat in winter to minimize heat transfer between indoor and outdoor when applied to a coating film of a glass window.

"Emissivity" refers to a ratio in which energy having any specific wavelength is absorbed, transmitted, and reflected by an object. That is, the emissivity in the present specification refers to an absorption degree of infrared ray energy included in an infrared wavelength region, specifically, means a ratio of infrared ray energy to be absorbed with respect to infrared ray energy to be applied when far-infrared ray corresponding to a wavelength region of about 5 μm to about 50 μm, i.e, strong thermal action, is applied.

According to Kirchhoff's theory, since infrared energy absorbed by an object is the same as infrared energy emitted by the object, an absorption rate of the object is the same as an emission rate (emissivity) of the object.

In addition, since infrared energy that is not absorbed by the object is reflected on the surface of the object, emissivity is decreased as reflectivity to infrared energy of the object is increased. Upon expressing the above-description as a numerical relationship, an equation (emissivity=1−infrared reflectivity) is provided.

The emissivity may be measured by various methods generally known in the art, for example, may be measured by equipments such as Fourier transform infrared spectroscopy (FT-IR), etc., according to KSL2514 standard.

An absorption rate to far-infrared ray having strong thermal action as described above, i.e., emissivity, of any objects, for example, low-emissivity glass, etc., may represent a significantly important meaning in measuring insulation performance.

Therefore, the low-emissivity coating film according to the present invention may have excellent abrasion resistance which is a mechanical property, and may have excellent corrosion resistance, acid resistance and basic resistance which are chemical properties, and may also have excellent thermal properties.

In addition, the present invention provides a method for manufacturing a low-emissivity coating film including: (a) preparing a low-emissivity coating layer stacked on at least one surface of a base; (b) forming a metal layer by depositing a metal on the low-emissivity coating layer; and (c) forming a metal oxide layer on the metal layer, and forming a metal oxynitride layer by depositing metal oxynitride.

The step (a) is a step of preparing a low-emissivity coating layer stacked on at least one surface of a base, wherein the preparing of the low-emissivity coating layer stacked on at least one surface of the base is not particularly limited, but may be performed by preparing a metal through lamination methods known in the art.

The step (b) is a step of forming the metal layer by depositing a metal on the low-emissivity coating layer, wherein the metal layer may be formed by deposition on the low-emissivity coating layer using deposition methods known in the art.

The step (c) is a step of forming the metal oxide layer on the metal layer, and forming a metal oxynitride layer by depositing metal oxynitride. Here, the forming of the metal oxide layer is preferably performed by partially oxidizing the surface of the metal layer through a post oxidation process of the surface of the metal layer, but is not limited thereto. The post oxidation process may be performed by using at least one reactive gas selected from the group consisting of oxygen ($O_2$), nitrogen ($N_2$) and argon (Ar). Through the above-described post oxidation process such as ion beam, reactive sputtering, and plasma treatment, etc., the oxidation of the surface of the metal layer and deposition of the metal oxynitride may be continuously performed in-situ, thereby further increasing process efficiency.

Further, the present invention provides a functional construction material for window and doors including the low-emissivity coating film as described above. By including the low-emissivity coating film, the functional construction material secures excellent insulation performance and light property by the low-e effect and has excellent durability as described above, thereby improving heat resistance performance. The functional construction material may be processed by heat treatment for improving wind pressure resistance, and may be used as a building material for skyscraper.

Hereinafter, preferred exemplary embodiments of the present invention will be described to assist in understanding the present invention. However, the following exemplary embodiments are provided only to more easily understand the present invention, and accordingly, the present invention is not limited thereto.

EXAMPLE

Example 1

A low-emissivity coating layer having a multilayer structure and an uppermost coating layer having a multilayer structure stacked on a transparent glass substrate were manufactured as described below by using a Magnetron sputtering deposition device (Selcos Cetus-S).

A first dielectric layer having a thickness of 35 nm was formed by depositing silicon aluminum nitride on a transparent glass substrate having a thickness of 6 mm under argon/nitrogen (80 vol % of argon, 20 vol % of nitrogen) atmosphere. Then, a first low-emissivity protection layer having a thickness of 1 nm, a low-emissivity layer having a thickness of 7 nm, and a second low-emissivity protection layer having a thickness of 1 nm were formed by depositing nickel chromium (NiCr), silver (Ag) and nickel chromium (NiCr) on the first dielectric layer under argon (100 vol %) atmosphere, respectively. Then, a second dielectric layer having a thickness of 35 nm was formed by depositing silicon aluminum nitride on the second low-emissivity protection layer under argon/nitrogen (80 vol % of argon, 20 vol % of nitrogen) atmosphere, thereby manufacturing the low-emissivity coating layer having a multilayer structure.

Next, a zirconium layer having a thickness of 4 to 5 nm was formed by depositing zirconium on the second dielectric layer under argon (100 vol %) atmosphere Then, a zirconium oxide layer having a thickness of 3 to 4 nm was formed by partially oxidizing a surface of the zirconium layer through a post oxidation process of the surface of the metal layer, and silicon aluminum oxynitride was continuously deposited in-situ to form a zirconium silicon oxynitride layer having a thickness of 10 nm, thereby manufacturing the uppermost coating layer having a multilayer structure.

Comparative Example 1

Comparative Example 1 was performed by the same manner as Example 1 except for omitting the manufacture of the uppermost coating layer having the multilayer structure.

Comparative Example 2

Comparative Example 2 was performed by the same manner as Example 1 except for omitting the formation of the zirconium silicon oxynitride layer in the uppermost coating layer having the multilayer structure.

Comparative Example 3

Comparative Example 3 was performed by the same manner as Example 1 except for omitting the formation of the zirconium layer by oxidizing all parts of the zirconium layer in the uppermost coating layer having the multilayer structure.

Experimental Example

1. Evaluation of Abrasion Resistance

Test for abrasion resistance was conducted 100 times on the low-emissivity coating films manufactured by Example 1 and Comparative Examples 1 to 3 under condition of 1 kg/mm$^2$ by using a Taber abrasion tester (Manufacturer: Taber Abraser, Erichsen company, Model No. 5135 Rotary Platform abraser), and scratch forms were measured by observation using an optical microscope (×200), and shown in Table 1. Images thereof taken by an optical microscope were shown in FIG. 2.

TABLE 1

| Classification | Example 1 | Comparative Example 1 | Comparative Example 2 | Comparative Example 3 |
| --- | --- | --- | --- | --- |
| Scratch form | Hairline scratch | Area scratch | Hairline scratch and Area scratch | Area scratch |

Figure 2:
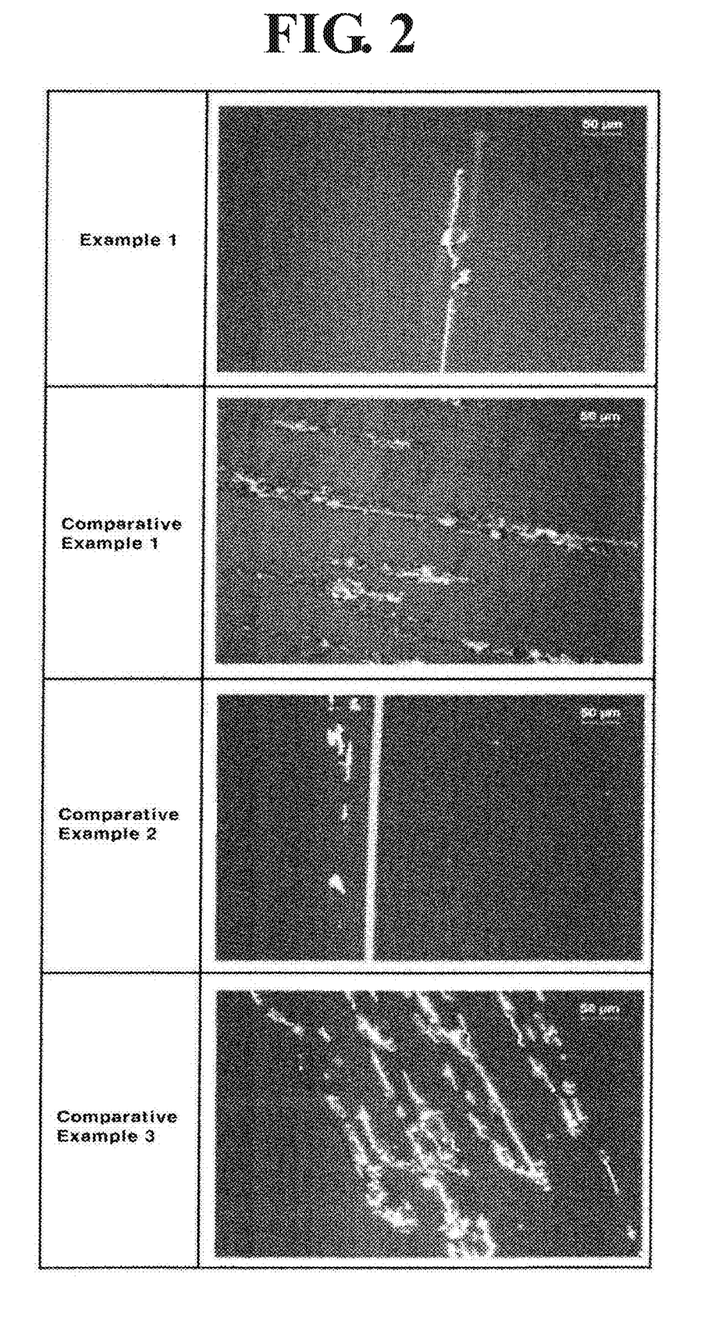
FIG. 2 shows a scratch degree of the low-emissivity coating film according to an exemplary embodiment of the present invention under specific condition, observed by an optical microscope.

FIG. 2 shows a scratch degree of the low-emissivity coating film according to the exemplary embodiment of the present invention under specific condition, observed by an optical microscope.

As shown in Table 1 and FIG. 2, it was confirmed that the scratch degree of Comparative Examples 1 to 3 was significant, such that abrasion resistance was poor. Meanwhile, it was confirmed that the scratch degree of Example 1 was not significant, and accordingly, as compared to Comparative Examples 1 to 3, Example 1 had remarkably improved abrasion resistance due to the lamination structure of the uppermost coating layer having excellent hardness.

2. Evaluation of Corrosion Resistance

(1) Moisture Resistance Test

Moisture resistance test (Day 3 and Day 7) was conducted on the low-emissivity coating films manufactured by Example 1 and Comparative Examples 1 to 3 under condition of moisture resistance 40° C. and 90% RH (humidity) by using a constant temperature and humidity chamber (LSIS Co., Ltd., EBS-35B), and corrosion degree was observed by using an optical microscope (×200). As a result, the number of corrosion points was calculated and shown in Table 2 below, and images thereof taken by an optical microscope were shown in FIG. 3a.

TABLE 2

| Classification | Example 1 | Comparative Example 1 | Comparative Example 2 | Comparative Example 3 |
| --- | --- | --- | --- | --- |
| Number of corrosion points (Day 3) | 4 | 129 | 44 | 63 |
| Number of corrosion points (Day 7) | 78 | 200 or more | 145 | 200 or more |

Figure 3A:
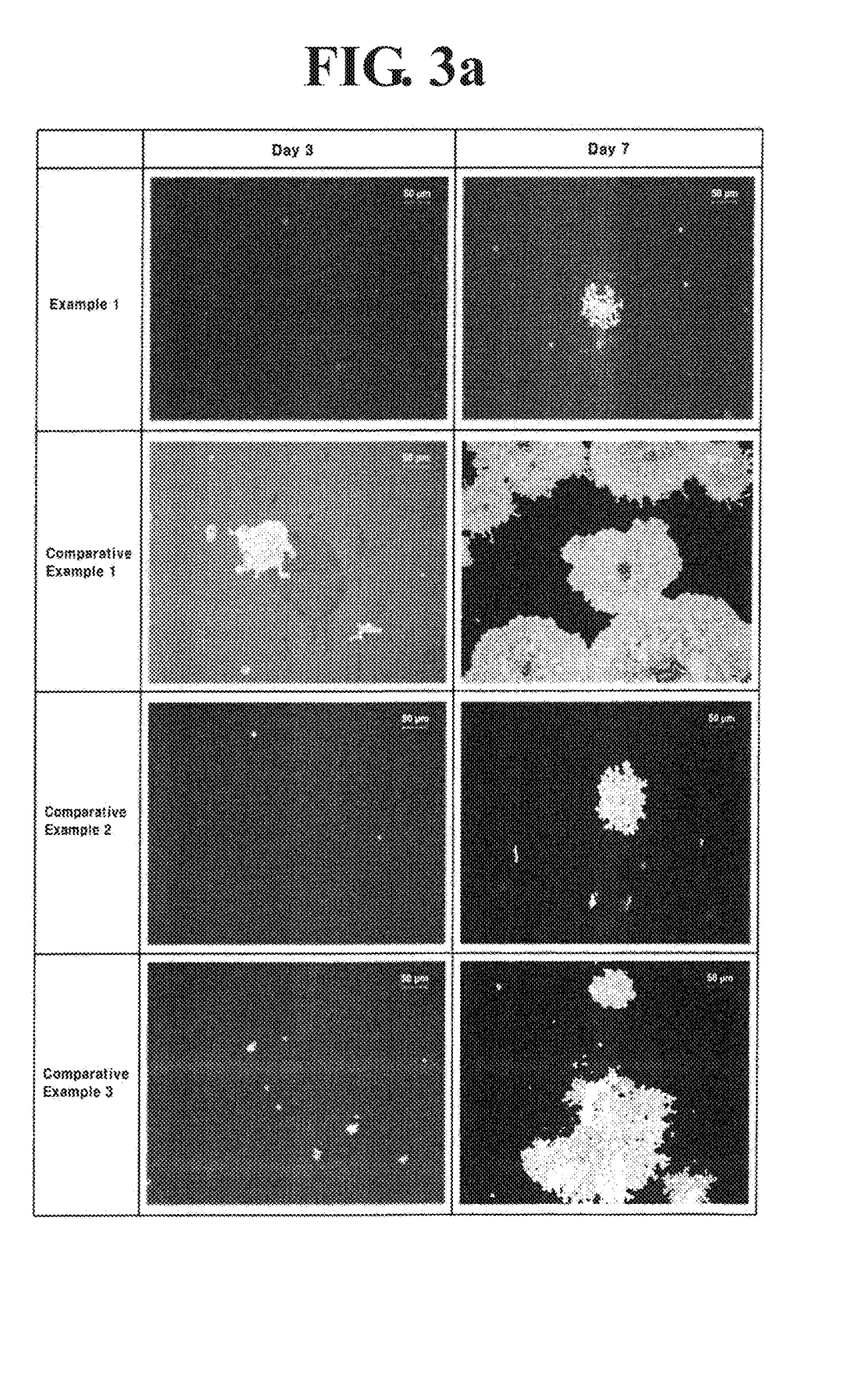
FIGS. 3a to 3c show a corrosion degree of the low-emissivity coating film according to an exemplary embodiment of the present invention under specific condition, observed by an optical microscope.

FIG. 3a shows a corrosion degree of the low-emissivity coating film according to the exemplary embodiment of the present invention under moisture resistance condition, observed by an optical microscope.

As shown in Table 2 and FIG. 3a, it could be confirmed that Comparative Examples 1 to 3 had a significantly large number of corrosion points, such that corrosion degree was remarkably high. Meanwhile, it could be confirmed that the number of corrosion points was 4 on Day 3 and 78 on Day 7 in Example 1, such that corrosion rarely occurred in Example 1, and as compared to Comparative Examples 1 to 3, Example 1 included the zirconium layer, the zirconium oxide layer, and the zirconium silicon oxynitride layer formed therein to inhibit diffusion of the chemical reaction materials introduced from the outside, for example, $O_2$, $H_2O$, $Na^+$, etc., into the low-emissivity layer 230, thereby further improving moisture resistance of the low-emissivity coating film.

(2) Test Using Distilled Water

A test using distilled water (Day 3 and Day 7) was performed in the same manner as the above moisture resistance test (1) except for under condition of distilled water saturation 25° C. and 99% RH (humidity). As a result, the number of corrosion points was calculated and shown in Table 3 below, and images thereof taken by an optical microscope were shown in FIG. 3b.

TABLE 3

| Classification | Example 1 | Comparative Example 1 | Comparative Example 2 | Comparative Example 3 |
| --- | --- | --- | --- | --- |
| Number of corrosion points (Day 3) | 0 | 12 | 0 | 2 |
| Number of corrosion points (Day 7) | 0 | 60 | 2 | 6 |

Figure 3B:
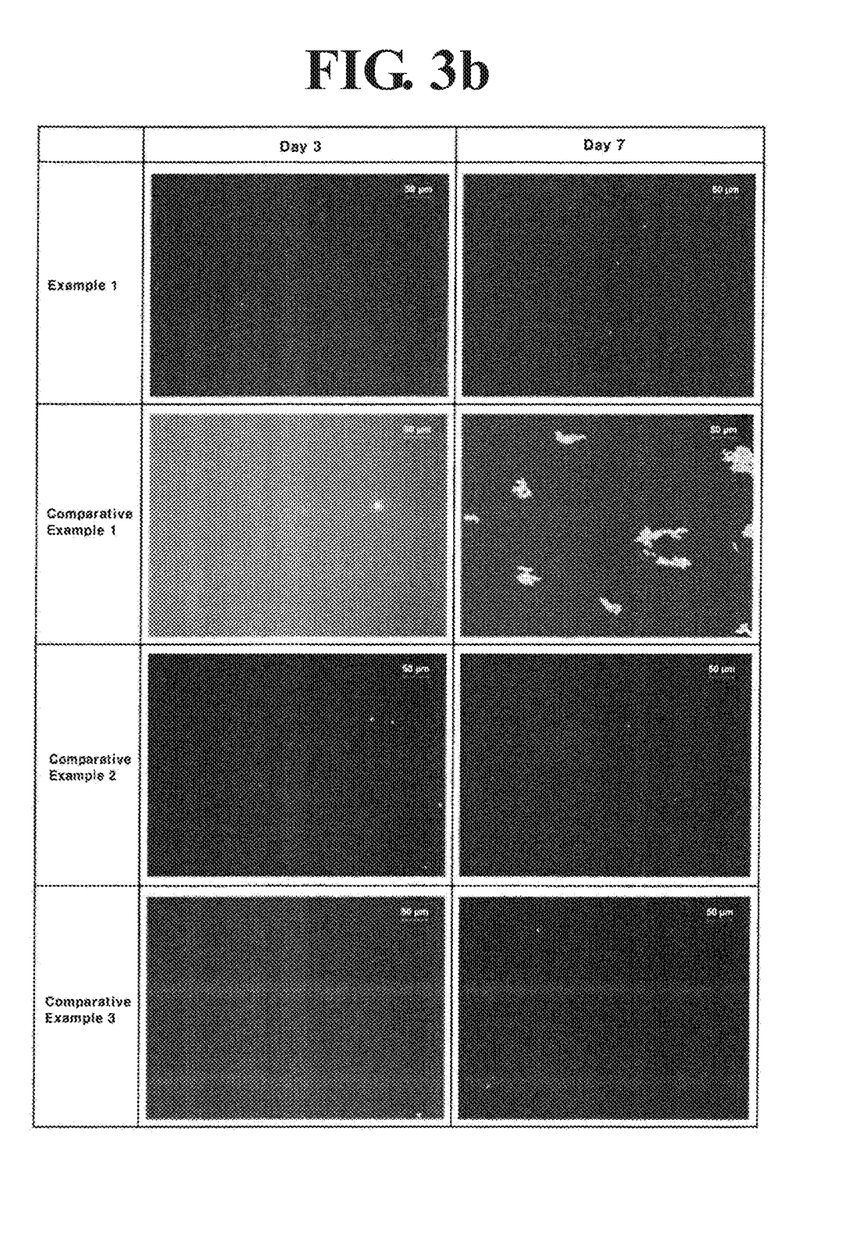

FIG. 3b shows a corrosion degree of the low-emissivity coating film according to the exemplary embodiment of the present invention under the distilled water saturation condition, observed by an optical microscope.

As shown in Table 3 and FIG. 3b, it could be confirmed that Comparative Examples 1 to 3 had a significantly large number of corrosion points, such that corrosion degree was remarkably high. Meanwhile, it could be confirmed that the number of corrosion points was 0 on Day 3 and 0 on Day 7 in Example 1, such that corrosion rarely occurred in Example 1, and as compared to Comparative Examples 1 to 3, Example 1 included the zirconium layer, the zirconium oxide layer, and the zirconium silicon oxynitride layer formed therein to inhibit diffusion of the chemical reaction materials introduced from the outside, for example, $O_2$, $H_2O$, $Na^+$, etc., into the low-emissivity layer 230, thereby further improving corrosion resistance of the low-emissivity coating film.

(3) Test Using Potassium Sulfate Solution

A test using potassium sulfate solution (Day 3 and Day 7) was performed in the same manner as the above-described moisture resistance test (1) except for under condition of potassium sulfate saturation 25° C. and 85% RH (humidity). As a result, the number of corrosion points was calculated and shown in Table 4 below, and images thereof taken by an optical microscope were shown in FIG. 3c.

TABLE 4

| Classification | Example 1 | Comparative Example 1 | Comparative Example 2 | Comparative Example 3 |
| --- | --- | --- | --- | --- |
| Number of corrosion points (Day 3) | 0 | 31 | 0 | 4 |
| Number of corrosion points (Day 7) | 3 | 200 | 5 | 37 |

Figure 3C:
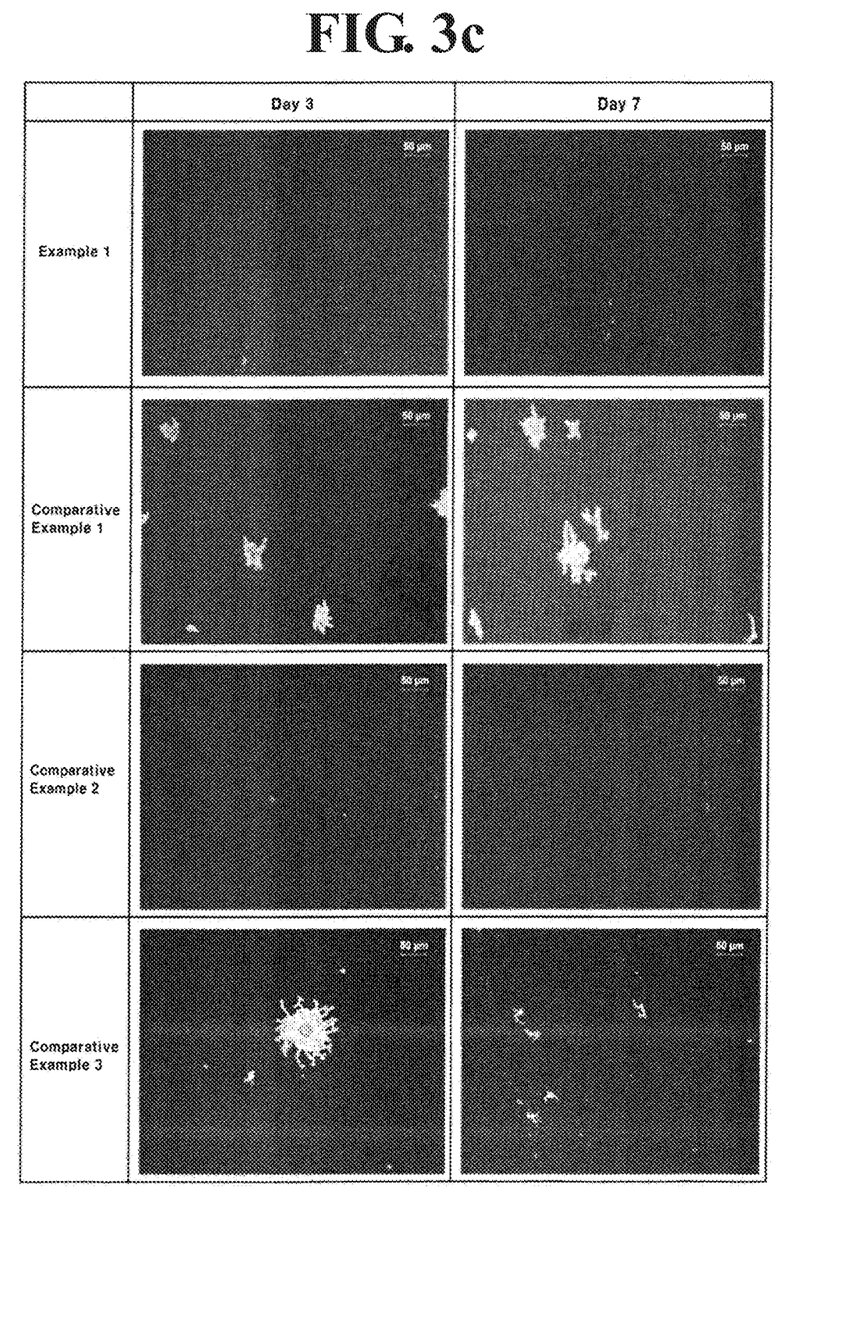

FIG. 3c shows a corrosion degree of the low-emissivity coating film according to the exemplary embodiment of the present invention under the potassium sulfate solution saturation condition, observed by an optical microscope.

As shown in Table 4 and FIG. 3c, it could be confirmed that Comparative Examples 1 to 3 had a significantly large number of corrosion points, such that corrosion degree was remarkably high. Meanwhile, it could be confirmed that the number of corrosion points was 0 on Day 3 and 3 on Day 7 in Example 1, such that corrosion rarely occurred in Example 1, and as compared to Comparative Examples 1 to 3, Example 1 included the zirconium layer, the zirconium oxide layer, and the zirconium silicon oxynitride layer formed therein to inhibit diffusion of the chemical reaction materials introduced from the outside, for example, $O_2$, $H_2O$, $Na^+$, etc., into the low-emissivity layer 230, thereby further improving corrosion resistance of the low-emissivity coating film.

3. Evaluation of Acid Resistance

The low-emissivity coating films manufactured by Example 1 and Comparative Examples 1 to 4 were immersed in an HCl solution (Sigma-Aldrich, pH 2) at room temperature for 5 minutes, and change values of color index before and after immersion were measured by using a spectro colorimeter (Manufacturer: KONICA MINOLTA, Model No. VTLCM-700), and a graph having the results thereof was shown in FIG. 4.

Figure 4:
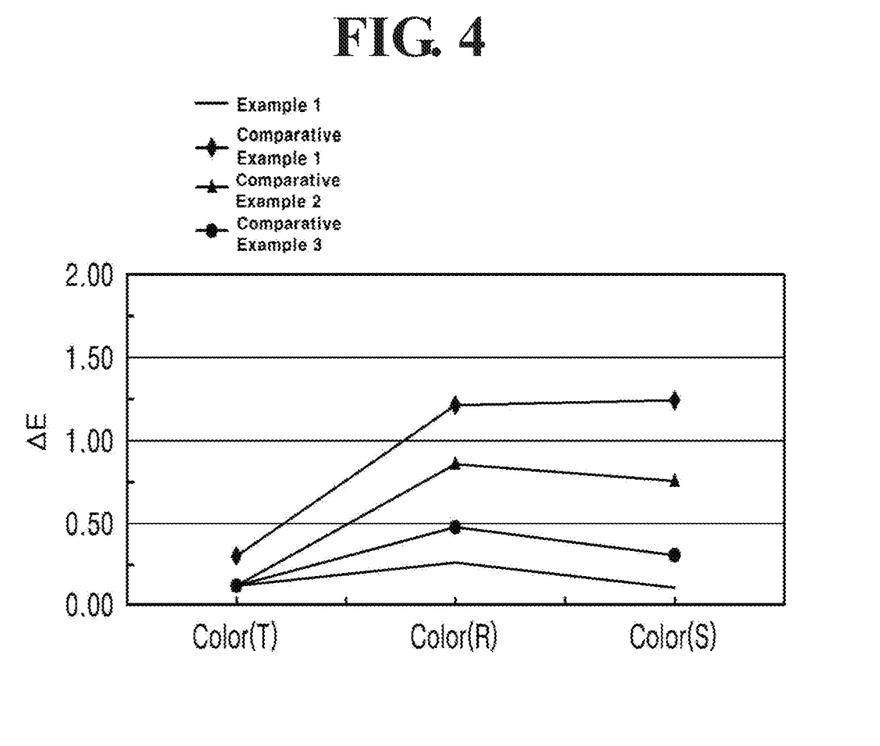
FIG. 4 shows a change value of a color index of the low-emissivity coating film according to an exemplary embodiment of the present invention under acidic condition.

FIG. 4 shows a change value of a color index of the low-emissivity coating film according to an exemplary embodiment of the present invention under acidic condition. Here, in FIG. 4, the color (T) in the X axis represents a color transmitted through a transparent glass substrate on which low-emissivity coating is coated, and the color (R) in the X axis represents a color reflected on the low-emissivity coating film, and the color (S) in the X axis represents a color reflected on the transparent glass substrate, and $\Delta E=(\Delta L^2+\Delta a^2+\Delta b^2)^{1/2}$ in the Y axis represents a change value of the color index.

As shown in FIG. 4, it could be confirmed that Comparative Examples 1 to 4 had a significantly large change in color index. Meanwhile, it could be confirmed that the change in color index rarely occurred in Example 1, and as compared to Comparative Examples 1 to 4, Example 1 included the zirconium layer, the zirconium oxide layer and the zirconium silicon oxynitride layer formed therein to inhibit diffusion of the chemical reaction materials introduced from the outside, for example, $O_2$, $H_2O$, $Na^+$, etc., into the low-emissivity layer 230, thereby further improving acid resistance of the low-emissivity coating film.

3. Evaluation of Thermal Properties

The low-emissivity coating films manufactured by Example 1 and Comparative Examples 1 to 3 were put into a box furnace equipment for laboratory of which an inner temperature was maintained to about 700° C., and maintained for 7 minutes, and taken them out. After heat treatment, a defect degree was observed by an optical microscope (×50).

Figure 5:
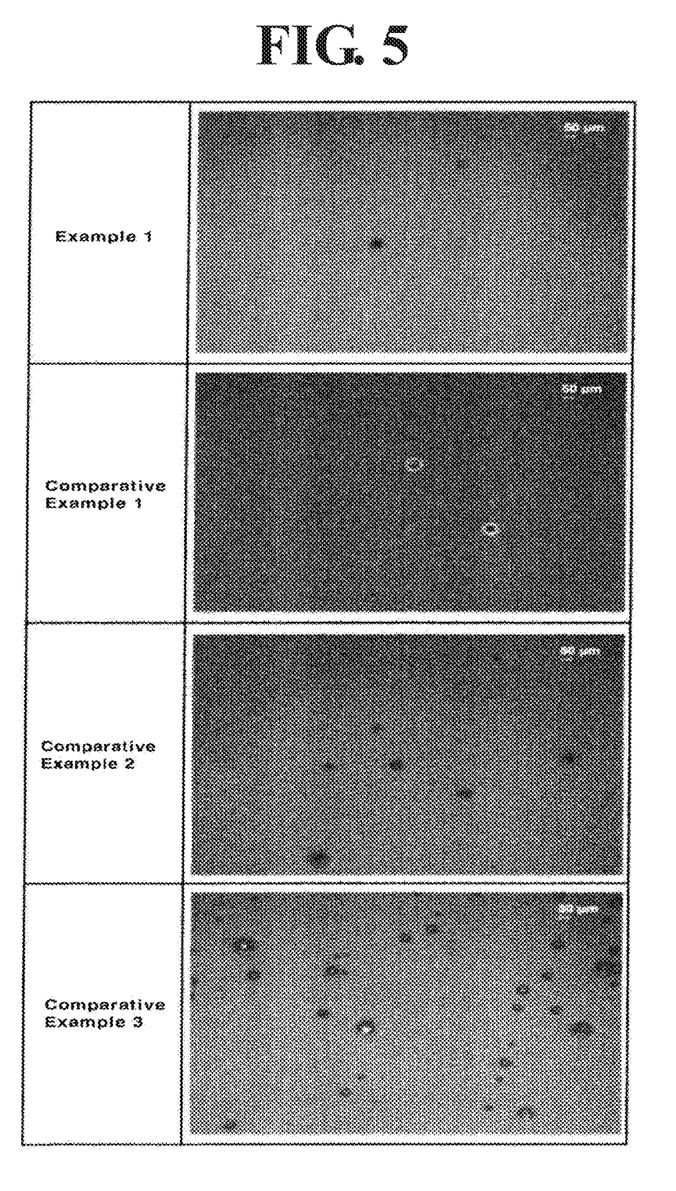
FIG. 5 shows a defect degree of the low-emissivity coating film according to the exemplary embodiment of the present invention after heat treatment, observed by an optical microscope.

FIG. 5 shows a defect degree of the low-emissivity coating film according to the exemplary embodiment of the present invention after heat treatment, observed by an optical microscope.

As shown in FIG. 5, it could be confirmed that Comparative Examples 1 to 3 had a significantly large defect degree. Meanwhile, it could be confirmed that structural deformation of the low-emissivity coating film less occurred in Example 1, such that the defect degree was small, and as compared to Comparative Examples 1 to 3, Example 1 had excellent thermal properties.

The above description of the present invention is provided for illustrative purposes, and it will be understood to those skilled in the art that the exemplary embodiments can be easily modified into various forms without changing the technical spirit or essential features of the present invention. Accordingly, the exemplary embodiments described herein are provided by way of example only in all aspects and should not be construed as being limited thereto.

The invention claimed is:

1. A low-emissivity coating film sequentially consisting of:
   a substrate formed of a glass or a transparent plastic;
   a low-emissivity coating layer on a surface of the substrate; and
   an uppermost coating layer on the low-emissivity coating layer,
   wherein the uppermost coating layer has a multilayer structure sequentially consisting of, from the low-emissivity coating layer, a metal layer on the low-emissivity coating layer, a metal oxide layer and a metal oxynitride layer,
   wherein the metal layer includes at least one selected from titanium, zirconium, titanium-based composite metal, zirconium-based composite metal, and combinations thereof,
   wherein the metal oxynitride layer is a zirconium silicon oxynitride layer,
   wherein the low-emissivity coating layer has a multilayer structure sequentially consisting of, from the substrate, a first dielectric layer on the substrate, a first low-emissivity protection layer, a low-emissivity layer, a second low-emissivity protection layer, and a second dielectric layer,
   wherein the metal oxide layer is formed by partially oxidizing the surface of the metal layer through a post oxidation process of the surface of the metal layer,
   wherein the first dielectric layer or the second dielectric layer comprises at least one selected from the group consisting of silicon aluminum nitride, silicon tin nitride, and combinations thereof, and
   wherein
   the first low-emissivity protection layer has a thickness of 0.5 nm to 1 nm,
   the low-emissivity layer has a thickness of 5 nm to 7 nm,
   the second low-emissivity protection layer has a thickness of 0.5 nm to 1 nm, and
   the metal oxynitride layer has a thickness of 10 nm to 20 nm.

2. The low-emissivity coating film of claim 1, wherein the metal oxide layer includes at least one selected from titanium oxide, zirconium oxide, titanium-based composite metal oxide, zirconium-based composite metal oxide, and combinations thereof.

3. The low-emissivity coating film of claim 1, wherein the first dielectric layer or the second dielectric layer includes the at least one doped with at least one element selected from the group consisting of bismuth (Bi), boron (B), aluminum (Al), silicon (Si), magnesium (Mg), antimony (Sb), beryllium (Be), and combinations thereof.

4. The low-emissivity coating film of claim 1, wherein the first low-emissivity protection layer or the second low-emissivity protection layer includes at least one selected from the group consisting of nickel (Ni), chromium (Cr), nickel (Ni)-chromium (Cr) alloy, titanium (Ti) and combinations thereof.

5. The low-emissivity coating film of claim 1, wherein the low-emissivity layer includes at least one selected from the group consisting of silver (Ag), gold (Au), copper (Cu), aluminum (Al), platinum (Pt), ion-doped metal oxides, and combinations thereof.

6. The low-emissivity coating film of claim 1, wherein the metal layer has a thickness of 0.5 nm to 5 nm.

7. The low-emissivity coating film of claim 1, wherein the metal oxide layer has a thickness of 0.5 nm to 5 nm.

8. The low-emissivity coating film of claim 1, wherein the metal oxynitride layer is the uppermost layer of the low-emissivity coating film.

9. A functional construction material for a window or doors, said construction material comprising a low-emissivity coating film, wherein the low-emissivity coating film sequentially consists of:

a substrate formed of a glass or a transparent plastic;

a low-emissivity coating layer on a surface of the substrate; and an uppermost coating layer on the low-emissivity coating layer, wherein the uppermost coating layer has a multilayer structure sequentially consisting of, from the low-emissivity coating layer, a metal layer on the low-emissivity coating layer, a metal oxide layer and a metal oxynitride layer, wherein the metal layer includes at least one selected from titanium, zirconium, titanium-based composite metal, zirconium-based composite metal, and combinations thereof, wherein the metal oxynitride layer is a zirconium silicon oxynitride layer, wherein the low-emissivity coating layer has a multilayer structure sequentially consisting of, from the substrate, a first dielectric layer on the substrate, a first low-emissivity protection layer, a low-emissivity layer, a second low-emissivity protection layer, and a second dielectric layer, wherein the metal oxide layer is formed by partially oxidizing the surface of the metal layer through a post oxidation process of the surface of the metal layer, wherein the first dielectric layer or a second dielectric layer comprises at least one selected from the group consisting of silicon aluminum nitride, silicon tin nitride, and combinations thereof, and wherein
the first low-emissivity protection layer has a thickness of 0.5 nm to 1 nm,
the low-emissivity layer has a thickness of 5 nm to 7 nm,
the second low-emissivity protection layer has a thickness of 0.5 nm to 1 nm, and
the metal oxynitride layer has a thickness of 10 nm to 20 nm.

* * * * *